(12) United States Patent
Chen

(10) Patent No.: US 9,851,443 B2
(45) Date of Patent: Dec. 26, 2017

(54) OPTICAL BEAM SWEEPER

(75) Inventor: Long Chen, North Brunswick, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1143 days.

(21) Appl. No.: 13/422,533

(22) Filed: Mar. 16, 2012

(65) Prior Publication Data

US 2013/0242400 A1    Sep. 19, 2013

(51) Int. Cl.
| | |
|---|---|
| *G01C 3/08* | (2006.01) |
| *G01S 17/42* | (2006.01) |
| *G02B 27/00* | (2006.01) |
| *G01S 7/481* | (2006.01) |
| *G01S 7/484* | (2006.01) |
| *G02B 6/12* | (2006.01) |
| *G02B 6/293* | (2006.01) |

(52) U.S. Cl.
CPC .............. *G01S 17/42* (2013.01); *G01S 7/484* (2013.01); *G01S 7/4814* (2013.01); *G01S 7/4817* (2013.01); *G02B 27/0087* (2013.01); *G02B 6/12007* (2013.01); *G02B 6/29301* (2013.01); *G02B 6/29335* (2013.01)

(58) Field of Classification Search
USPC ....... 356/4.01, 5.01, 3.01; 372/22, 9, 25, 97; 359/205, 742; 398/148; 362/249.01
See application file for complete search history.

(56) References Cited

U.S. PATENT DOCUMENTS

| | | | | |
|---|---|---|---|---|
| 6,833,540 | B2 * | 12/2004 | MacKenzie et al. | 250/214.1 |
| 7,133,130 | B2 * | 11/2006 | Storz et al. | 356/317 |
| 7,362,486 | B2 * | 4/2008 | Hayashi et al. | 359/205.1 |
| 7,369,778 | B2 * | 5/2008 | Liu et al. | 398/148 |
| 7,443,903 | B2 * | 10/2008 | Leonardo et al. | 372/97 |
| 7,792,431 | B2 * | 9/2010 | Jennings et al. | 398/161 |
| 8,208,504 | B2 * | 6/2012 | Dantus et al. | 372/22 |
| 8,494,016 | B2 * | 7/2013 | Karni et al. | 372/18 |
| 2008/0107372 | A1 * | 5/2008 | Fujimori et al. | 385/2 |
| 2010/0258632 | A1 * | 10/2010 | Good | 235/472.01 |
| 2013/0088872 | A1 * | 4/2013 | Ball | 362/249.01 |

\* cited by examiner

*Primary Examiner* — Samantha K Abraham
(74) *Attorney, Agent, or Firm* — Parker Justiss, PC

(57) ABSTRACT

An optical device, comprising an optical device, comprising an optical beam sweeper that includes a multi-wavelength laser source and an optical power splitter. The optical power splitter has an optical input optically coupled to the multi-wavelength laser source, the optical power splitter having N optical outputs, each optical output connected by a corresponding optical pathway of a parallel array to an optical output surface of the optical beam sweeper. N parallel optical paths connect the optical input to the optical output surface, each optical path including a corresponding one the optical pathways and having a different optical path length than the one or more other optical paths, the optical path lengths differing in a wavelength-dependent way.

21 Claims, 4 Drawing Sheets

OPTICAL BEAM SWEEPER

TECHNICAL FIELD OF THE INVENTION

The present invention is directed, in general, to an optical device and, more specifically, to an optical device comprising an optical beam sweeper, and methods for operating the same.

BACKGROUND OF THE INVENTION

Beam sweepers that scan an optical beam over a certain angular range, e.g., for the purposes of light detection and ranging (LIDAR) in a fashion similar to radio detection and ranging (RADAR), have many important applications.

SUMMARY

One embodiment includes an optical device, comprising an optical beam sweeper that includes a multi-wavelength laser source and an optical power splitter. The optical power splitter has an optical input optically coupled to the multi-wavelength laser source, the optical power splitter having N optical outputs, each optical output connected by a corresponding optical pathway of a parallel array to an optical output surface of the optical beam sweeper. N parallel optical paths connect the optical input to the optical output surface, each optical path including a corresponding one the optical pathways and having a different optical path length than the one or more other optical paths, the optical path lengths differing in a wavelength-dependent way.

In some embodiments, each optical pathway includes a corresponding controllable delay element capable of being adjusted to change a total phase change produced on propagating through the corresponding optical pathway. In some embodiments, the delay elements are configurable to cause a relative phase change of at least 1 degree between light emitted from ones of the optical pathways that are laterally neighboring on the output surface. In some embodiments, at least one of the controllable delay elements includes one or more optical resonators optically coupled to corresponding one of the optical pathways. In some embodiments, a resonance wavelength of at least one of the optical resonators is an output wavelength of the laser source. In some embodiments, the resonance wavelength of the at least one optical resonator is adjustable. In some embodiments, the delay elements are configured such that light emitted by neighboring ends of the optical pathways increases monotonically along one direction in the output surface. In some embodiments, different ones of the delay elements having different numbers of optical resonators therein. In some embodiments, the device includes at least 10 of the optical pathways. In some embodiments, the multi-wavelength laser source includes a plurality of lasers optically coupled to optical inputs of an optical combiner, an optical output of the optical combiner being optically coupled to the optical power splitter, each of the laser sources being configured to emit light at a wavelength different from the other of the laser sources. In some embodiments, the optical combiner is an optical wavelength multiplexer. In some embodiments, the device further includes a range-finding subunit configured as a light detection and ranging device, the optical beam sweeper being part of the range-finding subunit. In some embodiments, the optical beam sweeper is part of a light detection and ranging device that further includes an optical detector subunit and a positioning subunit.

Another embodiment is a method that comprises producing an optical output beam. Producing the optical output beam includes emitting an optical beam from a multi-wavelength laser source optically coupled to an optical power splitter, the optical power splitter having N optical outputs, each optical output connected by a corresponding optical pathway of a parallel array to an optical output surface of the optical beam sweeper. N parallel optical paths connect the optical input to the optical output surface, each optical path including a corresponding one the optical pathways and having a different optical path length than the one or more other optical paths, the optical path lengths differing in a wavelength-dependent way.

In some embodiments, the method includes changing a direction of the optical beam by changing the wavelength of the optical beam emitted by the multi-wavelength laser source. In some embodiments, the change in optical beam output different direction is produced without moving the beam sweeper or its component parts. In some embodiments, the method includes including simultaneously producing the plurality of optical output beams by emitting a plurality of the optical beams each having a different wavelength, each optical beam being emitted from the multi-wavelength laser source.

BRIEF DESCRIPTION OF THE DRAWINGS

The embodiments of the disclosure are best understood from the following detailed description, when read with the accompanying FIGURES. Some features in the figures may be described as, for example, "top," "bottom," "vertical" or "lateral" for convenience in referring to those features. Such descriptions do not limit the orientation of such features with respect to the natural horizon or gravity. Various features may not be drawn to scale and may be arbitrarily increased or reduced in size for clarity of discussion. Reference is now made to the following descriptions taken in conjunction with the accompanying drawings, in which.

DETAILED DESCRIPTION

Figure 1:
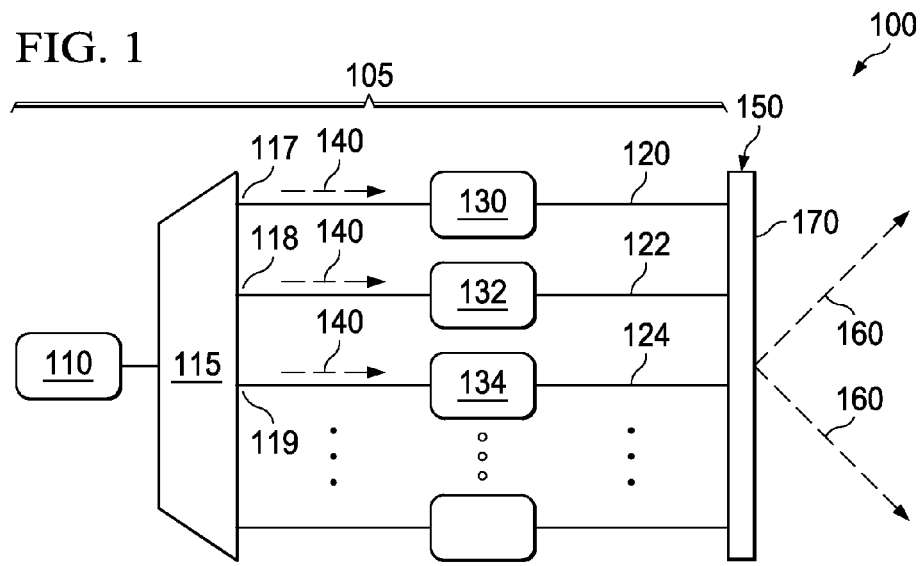
FIG. 1 illustrates a layout diagram of an optical device that includes an example beam sweeper of the disclosure.

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s)

to furthering the art, and are to be construed as being without limitation to such specifically recited examples and conditions. Moreover, all statements herein reciting principles, aspects, and embodiments of the invention, as well as specific examples thereof, are intended to encompass equivalents thereof. Additionally, the term, "or," as used herein, refers to a non-exclusive or, unless otherwise indicated. Also, the various embodiments described herein are not necessarily mutually exclusive, as some embodiments can be combined with one or more other embodiments to form new embodiments.

Some conventional LIDAR devices, may require many control elements and can have difficulty in producing multiple output beams with independent directional tunability. Herein it is recognized that some optical beam sweepers split a fixed wavelength laser light into numerous paths, and then controls the phase (or proportionate delay time) of each path in order to adjust the output beam's direction. Consequently, each output path requires a separate mechanism to control the phase, thereby increasing the complexity and cost of operating and fabricating the device. Additionally, with such designs, it may be difficult to produce multiple output beams with independent directional tunability. This is because the direction of the multiple output beams will be related to each other, such that if the direction of one beam is changed, then the direction of the other beams will also change by some mathematically related amount.

Embodiments of the present disclosure mitigate such limitations by using a multi-wavelength laser source to provide the optical input and also use N optical pathways having delay elements that are wavelength dependent. The extent of phase change (or proportionate delay time) of the optical beam passing through a particular delay element is dependent upon the wavelength of the optical beam emitted by the multi-wavelength laser source. Each delay associated with an output path has a specific dependence on wavelength, and, a set of delay elements for the output paths can be arranged in a specific way that affects the output beam's direction. By changing the wavelength of the optical beam emitted by the multi-wavelength laser source, the direction of the optical beam output from the beam sweeper can be changed without further control or adjustment of the individual delay elements or movement of the device. Moreover, in some embodiments, the multi-wavelength laser source includes multiple wavelength—tunable lasers can be coupled to the beam sweeper and then adjusted such that each laser emits an optical beam of a different wavelength thereby producing multiple optical output beams that these embodiments output in directions that are different for the different wavelengths.

One embodiment of the disclosure is an optical device. FIG. 1 illustrates a layout diagram of a device 100 that includes an example optical beam sweeper 105. The beam sweeper 105 comprises a multi-wavelength laser source 110 and an optical power splitter 115 optically coupled to the multi-wavelength laser source 110.

Herein, a multi-wavelength laser source, e.g., the multi-wavelength laser source 110 of FIG. 1, is capable of emitting laser light at a plurality of different center output wavelengths. For example, a multi-wavelength laser source may be capable of varying its center output wavelength by at least 0.001 percent of the center output wavelength or by at least 0.01 percent thereof. Some such multi-wavelength laser sources can only output light at about one center wavelength at any one time. For example, such a multi-wavelength laser source may include a wavelength-tunable laser, e.g., whose optical lasing cavity has a tunable optical path length. Some above multi-wavelength laser sources can output light at several different center wavelengths at any one time. For example, such a multi-wavelength laser source may include an array of separate lasers, each laser of the array being configured to output light at a center wavelength differing from that of light output by the other lasers of the array. Some multi-wavelength laser sources may be able to output light at two or more substantially different center wavelengths at the same time.

The optical power splitter 115 (e.g., also referred to as a beam splitter) has multiple optical beam outputs 117, 118, 119. The optical power splitter 115 is configured to output about the same or substantially different portions of the received optical power to each of the individual beam outputs 117, 118, 119, in a substantially wavelength independent manner. The optical beam sweeper 105 also comprises optical pathways or waveguides 120, 122, 124 each being optically coupled to individual ones of the multiple outputs 117, 118, 119. Each one of the optical pathways 120, 122, 124 is associated with a different optical delay element 130, 132, 134. Each one of the optical delay elements (e.g., delay element 130) causes a phase change in an optical beam 140 traveling through the one optical pathway (e.g., pathway 120), the phase change value being different from the phase change value caused by the other optical delay elements (e.g., optical delay elements 132, 134) associated with one of the other optical pathways (e.g., optical pathways 122, 124). The phase change values are also dependent upon the wavelength of the optical beam 140 traveling though the optical pathways 120, 122, 124.

Figure 2A:
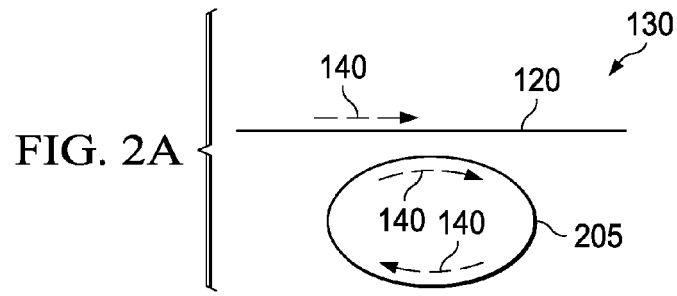
FIG. 2A presents an example delay element of the disclosure.

The term optical pathway as used herein refers to an optical guide (e.g., a planar optical waveguide or an optical fiber) or portion of free space, through which a collimated optical beam emitted from the multi-wavelength laser source 110 can travel. The term, optical delay element, as used herein refers to an optical component that causes the optical beam 140 traveling through the optical pathways 120, 122, 124 to have a phase change (and proportional delay time). FIG. 2A presents an example delay element 130 for the optical pathway 120, an optical resonator 205 that is optically coupled to optical pathway 120, such as an all-pass ring resonator. In some embodiments, the delay element 130 can include a plurality of all-pass ring resonators or other optical resonators, such as a band-pass ring resonators. In still other embodiments, the delay element 130 can include or be a Mach-Zehnder interferometer. In yet other embodiments, the delay element 130 can include or be a simple waveguide with substantial dispersion (i.e., the propagation delay time varies with the wavelength), or can include or be a waveguide with specially engineered strong dispersion (e.g., photonic crystal waveguide) to enhance the beam sweeping sensitivity. In some cases when the pathway is a free space pathway, the delay element can include a structure containing dispersive elements (such as a diffractive grating) and multiple mirrors. In such a structure, the free space optical beam can take different propagation paths depending on the optical beam's wavelength thereby causing different delays and substantially or strongly wavelength dependent optical path lengths.

In various embodiments, total optical path lengths of different ones of the N parallel optical paths between the optical input of the optical power splitter 115 and the optical output surface 150 of the optical beam sweeper 105, e.g., the surface 150 may be an edge or facet of a planar optical chip, are substantially different. Here, each individual parallel optical path is defined and in correspondence with an individual optical beam 140 or equivalently a corresponding one of the N optical pathways 120, 122, 124, etc . . . . Each one of the parallel optical paths has a segment along a corresponding single one of the optical beams 140. Due to the substantially different total optical path lengths of the N parallel optical paths, coherent light that is received at the optical power splitter 115 from the multi-wavelength laser source 110 will arrive at the optical output surface 150 of the optical beam sweeper 105 with a phase that substantially varies with the identity of the one of the N optical paths that carried the light therebetween.

The resonator 205 is optically coupled to one of the pathways 120 and is configured to cause a phase change in the optical beam 140 traveling through it so that the total-phase change over the corresponding optical path is different than the total phase change of light traveling over the other parallel optical paths beams 140 between the optical input of the optical splitter 115 and the output optical plane or facet 150 (FIG. 1). For example, in some cases, the phase change caused by any one of the delay elements 130 is at least about 1 degree different, and in some cases at least about 2 degrees different, and in other cases at least about 5 degrees different, than the phase change caused by any of the other delay elements 132, 134 to produce sufficient relative differences in total phase changes over different ones of the parallel optical paths.

Figure 2B:
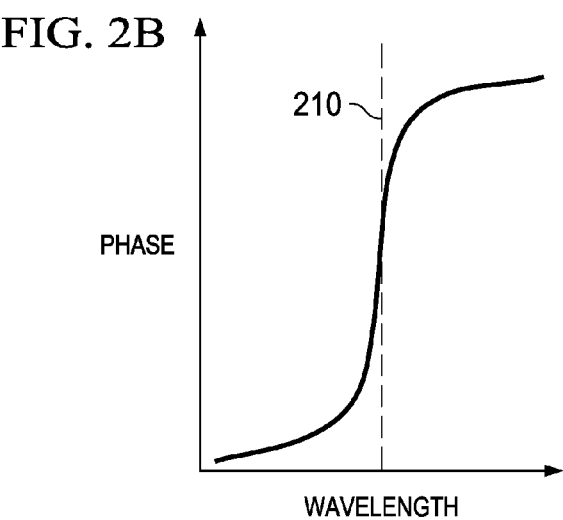
FIG. 2B presents an example wavelength dependence of an example delay element of the disclosure.

As noted above, the phase change value (e.g., the particular phase change in degrees or radians) caused by a delay element 130 is dependent upon the wavelength of the optical beam 140 traveling though the one optical pathway 120. FIG. 2B presents a generic example wavelength dependence of an example delay element 130 of the disclosure. As illustrated the wavelength dependence can follow a sigmoidal function where the change is phase with wavelength progressively reaches a maximum at a particular wavelength and then decreases with further increases in the wavelength.

Greater or lesser wavelength dependence can be adjusted, for example, via a controller that is able to opto-electrically or thermally vary a refractive index of the optical resonator in the delay element(s) 130. thereby Such a refractive index variation can be used, e.g., to tune the resonator's resonant frequency (or equivalent wavelength) of the delay element 130 to be close to the wavelength 210 of the optical beam 140 travelling through the pathway 120. The resonance frequency of the delay element 130 can be adjusted by changing the size of the ring resonator or otherwise adjusting the resonance frequency such as afforded by an optical phase shifter, or other structures, familiar to those skilled in the art. In some cases, for example, the delay element 130 causes at least 0.1 picosecond delay difference over the wavelength range in the light traveling through the pathway 120. In some cases, for example, the resonance wavelength of each of the delay elements 130, 132, 134 are within 1 percent, and more preferably 0.5 percent and even more preferably 0.1 percent, of the wavelength of the optical beam 140 traveling through the associated pathway 120, 122, 124.

In some embodiments of the device 100, the resonance wavelengths of one or more optical resonators 205 (FIG. 2A) are adjustable. For instance, an electro-optically or thermally controlled phase shifter (e.g. a thermal phase shifter) can be coupled to the optical ring resonators 205 to facilitate tuning (e.g., further tuning in some cases) of the resonance frequency so that it is close to the wavelength of the optical beam 140 traveling through the pathways 120. Such tuning can be used, e.g., to correct the variations in the resonance frequency caused by for example fabrication imperfections. However, in other embodiments, optical resonators 205 can be fixed (non-adjustable), thereby making the delay elements 130, 132,134 fixed delay elements.

In some embodiments, the delay elements 130, 132, 134 are configured to generate an ordered set of phase changes. That is, the phase change caused by each of the delay elements 130, 132, 134 follows a mathematical function. For example, in some cases, the ordered set of phase changes is about linearly incremented from one of the delay elements 130 to the adjacently located delay element (e.g., the delay elements 132 associated with the adjacent pathway 122). Such an embodiment is further illustrated in FIG. 3, which presents a plan view of a portion of an example beam sweeper 105 similar to beam sweepers 105 discussed in the context of FIGS. 1-2B.

Figure 3:
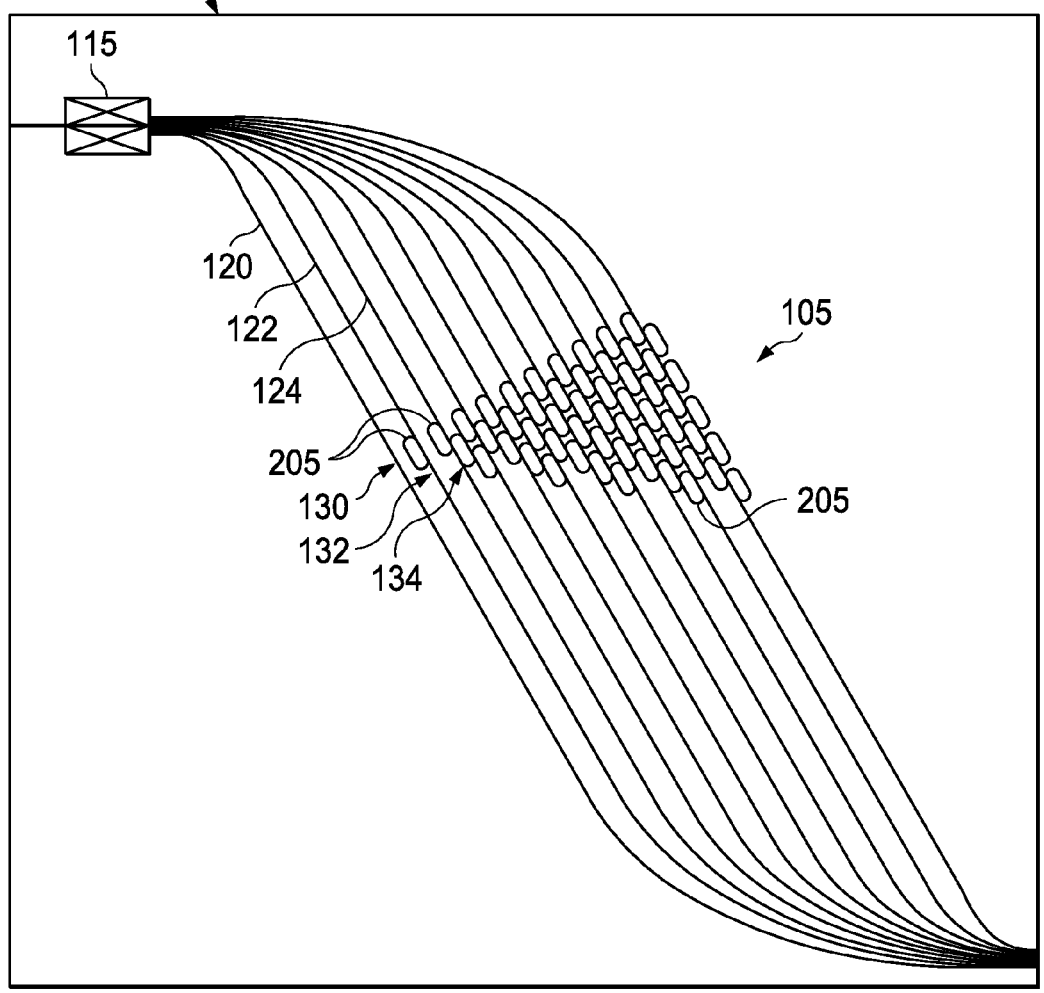
FIG. 3 presents a plan view of a portion of an example beam sweeper design similar to beam sweepers discussed in the context of FIGS. 1-2B.

In the example embodiment depicted in FIG. 3, the first delay element 130 is simply the pathway 120 itself, with no additional optical components to introduce further phase changes. The second pathway 122 adjacent to the first pathway 120 can have an associated delay element 132 corresponding to a single ring resonator 205 (FIG. 2). The third pathway 124 adjacent to the second pathway 122 can have a delay element 134 that correspond to two ring resonators 205. Each additional delay element associated with the other pathways can incrementally have one additional resonator 205 so as to form a set of linearly incremented phase change values, i.e., linear in the sequential lateral position of a pathway among the set of parallel optical pathways. Herein, the incremental change in the optical path length between adjacent parallel optical paths corresponds to the phase change added by to the optical path length by an additional resonator 205.

As illustrated in FIG. 3, in some embodiments, to facilitate forming the linear incrementing set of phase change values in adjacent optical pathways or waveguides 120, 122, 124, etc . . . , the number of delay elements (e.g., delay elements 132, 134, etc . . . ) is incremented by one between adjacent optical pathways of waveguides 120, 122, 124 etc . . . in one lateral direction along the surface of the substrate. Each of the delay elements 132, 134, etc . . . has a different number of optical resonators 205 of about same-size as compared to the delay elements 132, 134, etc . . . associated with the other pathways. That number, increases linearly between adjacent optical pathway or waveguide 120, 122, 124, etc . . . .

One skilled in the art would understand that there can be many different arrangements of the delays elements 130, 132, 134, resonators 205 and the incremental phase changes caused by such components. For example, in some cases, the delay elements 130, 132, 134 could be configured to cause an ordered set of phase changes where the incremental change in the phase change value follows a non-linear function, e.g., the phase change grow as a power of the lateral sequence number of the optical pathway or waveguide 120, 122, 124, etc . . . , wherein the power is higher than 1.

As further illustrated in FIG. 3, in some embodiments it is desirable to have a large number of optical pathways or waveguides 120, 122, 124 to help reduce the size of intensity side lobes of light output from the collection of free ends formed by the optical pathways 120, 122, 124, . . . and thereby make the emitted optical output beam 140 narrower than otherwise obtain using only two or three pathways. For example, in some embodiments, the there are at least 10 optical pathways 120, 122, 124. In some embodiments it can be desirable to have a specific distribution of the optical power in the optical pathways, which affects the shape of the output sweeping beam. For example, in some cases, a Gaussian distribution of the optical power is desired to suppress the side lobes in the output beam.

Figure 4:
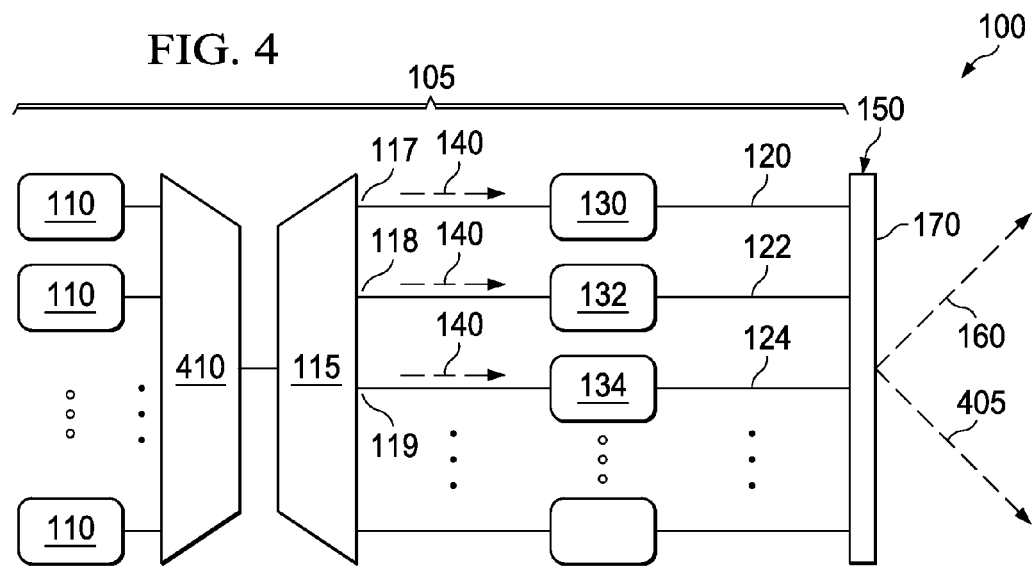
FIG. 4 illustrates a layout diagram of another optical device that includes a second example beam sweeper of the disclosure.

FIG. 4 illustrates a layout diagram of another optical device 100 that includes a second example beam sweeper 105 of the disclosure. As illustrated in FIG. 4 the beam sweeper 105 includes a multi-wavelength laser source that includes an array of different wavelength lasers 110 and an optical beam combiner 410. In some cases, the optical beam combiner 410 is configured as a wavelength multiplexer. The optical beam combiner 410 is optically coupled to the beam splitter 115. Each of the lasers 110 of the array is configured to emit an optical beam at a center wavelength that is different from the center wavelength(s) of the optical beam emitted by any of the other laser(s) 110 of the array. All emitted optical beams are coupled to the splitter 115 and to all of the optical pathways (e.g., 120, 122, 124), i.e., the optical beam 140 in each of these pathways contains all of the emitted wavelengths. In some embodiments, the center wavelengths emitted by each of the lasers 110 are different from each other by at least about 0.001 percent and in some cases, by at least about 0.01 percent.

As also illustrated in FIGS. 1, 3 and 4, embodiments of the device 100 can further include an output facet 150 positioned to receive the optical output from some or all of the pathways 120, 122, 124 and produce therefrom an optical output beam 160, 405. The optical output beam 160 from the sweeper 105 emitted from the output facet 150 is typically a coherent combination of the optical beams 140 traveling through the optical pathways or waveguides 120, 122, 124, . . . and their associated delay elements 130, 132, 134, . . . . In some cases the output facet 150 can include or be an edge facet where the output beam 140 exits from all of the optical pathways 120, 122, 124, . . . , e.g., planar optical waveguides. In such cases the sweeping beam sweeps in the plane on which the pathways are located, e.g., as the wavelength is varied or the delay elements 130, 132, 134, . . . are varied. In some cases the output facet can include optical elements that redirect the optical output beam 160, 405 from all of the pathways towards the direction normal to the planar surface on which the pathways are located, and the sweeping beam sweeps in a plane perpendicular to the planar surface on which the pathways are located. For example, the output facet 150 include an obliquely oriented edge that reflects light in such a direction, or alternatively a mirror may receive light output at the edge of the output facet 150 and cause such a redirection of the light.

Figure 5:
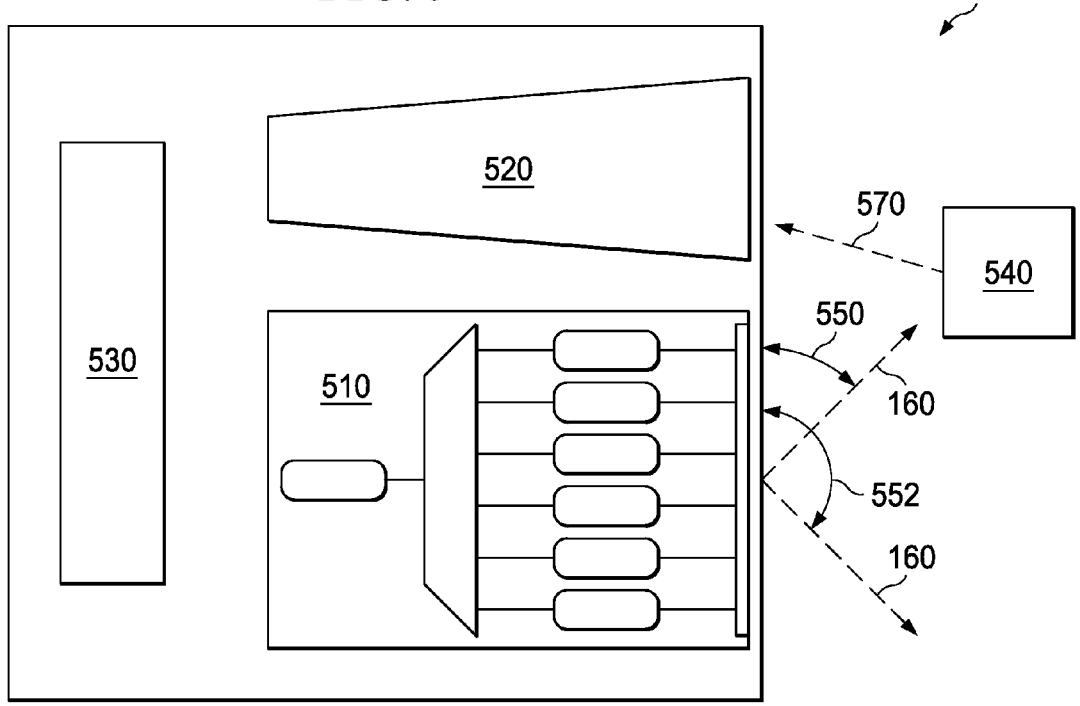
FIG. 5 shows a layout diagram of an example device of the disclosure configured as a LIDAR device.

FIG. 5 shows a layout diagram of an example device 100 of the disclosure configured as a light detection and ranging (LIDAR) device. In such embodiments, the optical beam sweeper 105, such as any of example beam sweepers 105 discussed in the context of FIGS. 1-4, can be part of a range-finding subunit 510 of the device 100. Some embodiments of the multi-wavelength laser source 110 (FIG. 1) or plurality of different-wavelength lasers 110 (FIG. 4) of the sweeper 105 can be configured to emit the optical output beam 160, 405 at a value in range of wavelengths from the ultraviolet to near-infrared wavelength.

As shown in FIG. 5 the device 100 can also include an optical detector subunit 520 and a positioning subunit 530. Some embodiments of the optical detector subunit 520 can include a photodetector or photomultiplier configured to receive one or more of the wavelengths of light emitted from the beam sweeper (e.g., a wavelength in the ultraviolet to near-infrared wavelength range). In particular, such a photodetector may be configured to receive such light after being reflected off of an object 540 that is in the path of the optical beam output 550 of the beam sweeper 105, e.g., light reflected back from a target of the optical beam sweeper 105.

Some embodiments of the positioning subunit 530 can include a global positioning system that is configured to determine the absolute position and orientation of the object 540 based on the distance between the object 540 and the device 100 and the angle 550 of the emitted optical beam output 160.

Figure 6:
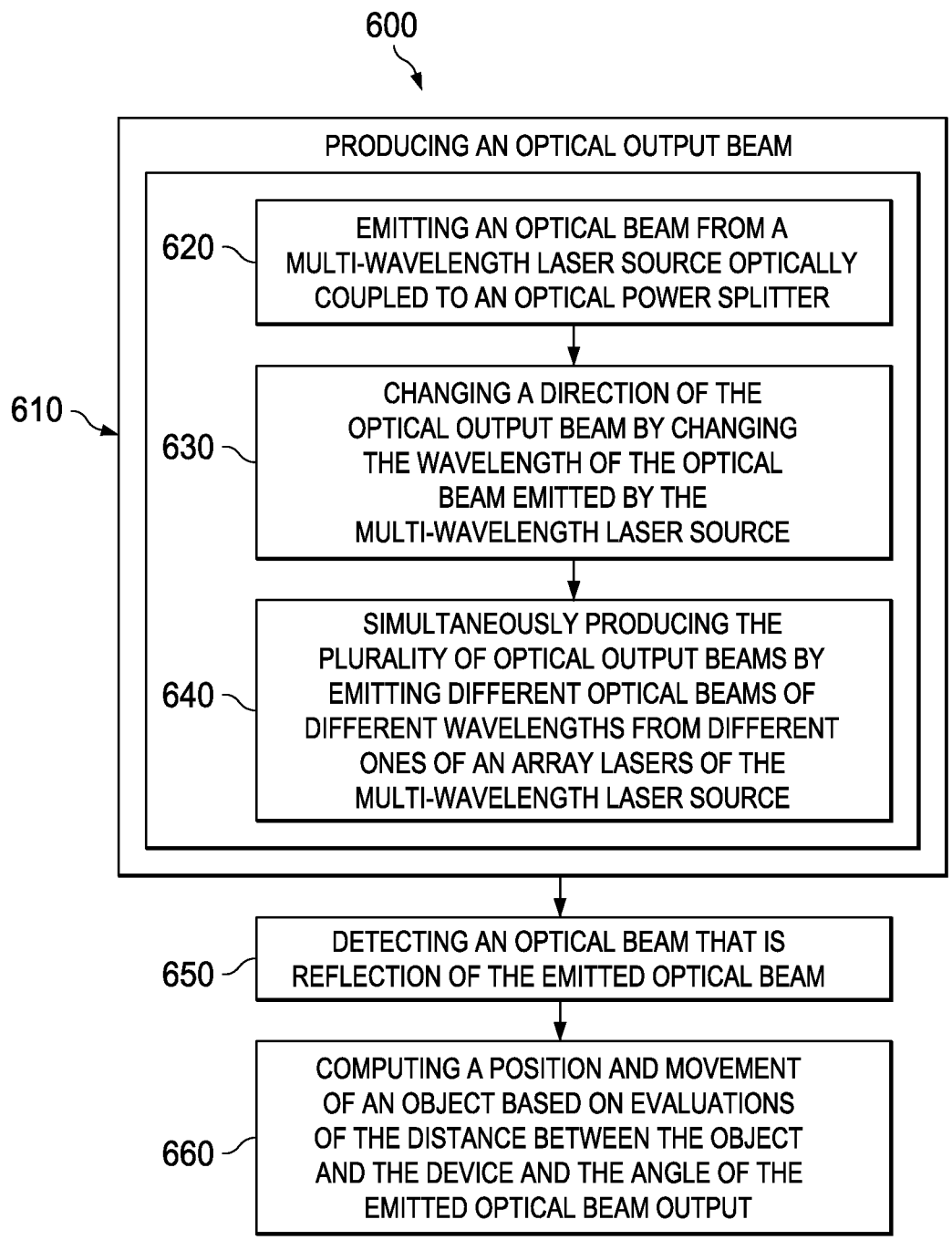
FIG. 6 presents a flow diagram illustrating an example method for operating a device of the disclosure, such as any of the devices discussed in the context of FIGS. 1-4.

Another embodiment of the disclosure is a method of operating an optical device. FIG. 6 presents a flow diagram illustrating an example method 600 for operating the optical device of the disclosure, such as any of the devices 100 discussed in the context of FIGS. 1-5.

With continuing reference to FIGS. 1-5, the method 600 shown in FIG. 6, comprises a step 610 of producing an optical output beam 160. Producing the output beams 160 in step 610 includes a step 620 of emitting an optical beam 140 from a multi-wavelength laser source 110 optically coupled to an optical power splitter 115, e.g., an optical power-type splitter, e.g., an optical beam splitter. The optical power splitter 115 has multiple outputs 117, 118, 119, each one of the multiple outputs 117, 118, 119 etc . . . being optically coupled to one of a plurality of optical pathways or waveguides 120, 122, 124, etc . . . . Each one of the optical pathways or waveguides 120, etc . . . has an associated optical delay element 130, etc . . . that causes a phase change in the optical beam 140 passing through the optical pathway or waveguide 120. The induced phase change value is usually different than the phase change for the optical beam 140 passing through any of the other of the optical pathways or waveguides 122, 124, etc . . . . The phase change is dependent upon the wavelength of the optical beam 140 passing through the pathway 120. In particular, the total accumulated phase change between the input of the optical splitter 115 and the output 170 of the beam sweeper is different for light traveling on different ones of the parallel optical pathways or waveguides 120, 122, 124, etc . . . .

In some embodiments, producing the output beam 160 in step 610 further includes a step 630 of changing a direction of the optical output beam 160 by changing the wavelength of the optical beam 140 emitted by the multi-wavelength laser source 110, e.g., a wavelength-tunable laser. In such embodiments, the optical output beam 160 is directed in the different direction without moving or re-orienting the beam sweeper 105 or its component parts. Not having to move the sweeper 105 facilitates producing a more precise and reproducible change in the direction of the output beam 160 because mechanical vibrations are avoided.

For example, in some cases, changing the direction of the output beam 160 in step 630 causes the output beam 160 to change from one angle 550 to another angle 552 (FIG. 5) relative to a planar surface 170 of an output facet 150 (FIG. 5) of the beam sweeper 105, by changing the wavelength of the optical beam 140 emitted by the multi-wavelength laser source 110. For example, in some cases the optical output beam 160 exits the output facet 150 at an angle 550 that can range from 5 to 175 degree relative to a planar outer surface 170 of the output facet.

In some embodiments of the method 600, the step 610 of producing an optical output beam 160 can further include a step 640 of simultaneously producing a plurality of optical output beams 160, by emitting different optical beams 140 of different wavelength from different ones of an array of lasers of the multi-wavelength laser source 110, e.g., as shown in FIG. 4. The beams 140 of different wavelengths emitted from different ones of the tunable lasers of the source 110 are optically coupled to the optical power splitter 115 via an optical beam combiner 410, e.g., an optical power combiner or an optical multiplexer, located between the lasers 110 and the beam splitter 115. In some cases, the simultaneously outputted beams 160, 405 each have different angles 550, 552 as shown in FIG. 5. That is, the angles are different relative to a planar surface 170 of an output facet 150 positioned to receive the optical beams 140 from each of the pathways 120, 122, 124, etc . . . . In such embodiments, the plurality of simultaneously outputted beams 160, 405 may be directed into the different directions due to the differences in wavelengths of the beams 160, 405 and do not typically involve moving or reorienting the beam sweeper 105 or its component parts.

Some embodiments of the method can further include a step of performing LIDAR functions with the optical device 100 such as discussed in the context of FIG. 5. For instance, the method 600 can further include a step 650 of detecting an optical beam 570 that is a reflection of the emitted optical output beam 160. The back reflected optical beam 570, e.g., reflected off of a target object 540 in the path of the output beam 160 can be detected by an optical detector subunit 520 of the device 100. For instance, the method 600 can further include a step 660 of computing a position velocity, and/or future position of the object 540, based on multiple evaluations of the distance between the object 540 and the device 100 and the angle 550 of the emitted optical beam output 550, e.g., using a positioning subunit 530 of the device 100.

Although the embodiments of the present invention has been described in detail, those skilled in the art should understand that they can make various changes, substitutions and alterations herein without departing from the scope of the invention.

What is claimed is:

1. An optical device, comprising:
   an optical beam sweeper, including:
      a multi-wavelength laser source,
      an optical power splitter having an optical input optically coupled to the multi-wavelength laser source, the optical power splitter having N optical outputs, each optical output connected, by a corresponding optical pathway of a parallel array, to a common optical output surface of the optical beam sweeper; and
   wherein each of the corresponding N parallel optical pathways connecting the optical input to the common optical output surface has a different optical path length than the other parallel optical pathways, the different optical path lengths differing in a wavelength-dependent way.

2. The device of claim 1, wherein each of the optical pathways includes a corresponding controllable delay element capable of being adjusted to change a total phase change produced on propagating through the optical pathway.

3. The device of claim 2, wherein the delay elements are configurable to cause a relative phase change of at least 1 degree between light emitted from ones of the optical pathways that are laterally neighboring on the output surface.

4. The device of claim 2, wherein at least one of the controllable delay elements includes an optical resonator optically coupled to corresponding one of the optical pathways.

5. The device of claim 4, wherein the optical resonator is configured as an all-pass resonator.

6. The device of claim 4, wherein a resonance wavelength of the optical resonator is within 1 percent of an output wavelength of the laser source traveling through the corresponding optical pathway.

7. The device of claim 4, wherein a resonance wavelength of the optical resonator is adjustable.

8. The device of claim 2, wherein the corresponding controllable delay elements are configured such that light emitted by neighboring ends of the optical pathways increases monotonically along one direction in the output surface.

9. The device of claim 2, wherein the each of the corresponding controllable delay elements of the optical pathways have a different number of optical resonators therein.

10. The device of claim 1, wherein the device includes at least 10 of the corresponding optical pathways.

11. The device of claim 1, wherein the multi-wavelength laser source includes a plurality of lasers optically coupled to optical inputs of an optical beam combiner, an optical output of the optical beam combiner being optically coupled to the optical power splitter, each of the lasers being configured to emit light at a wavelength different from the other of the lasers.

12. The device of claim 11, wherein the optical beam combiner is an optical wavelength multiplexer.

13. The device of claim 1, further including a range-finding subunit configured as a light detection and ranging device, the optical beam sweeper being part of the range-finding subunit.

14. The device of claim 1, wherein the optical beam sweeper is part of a light detection and ranging device that further includes an optical detector subunit and a positioning subunit.

15. The device of claim 1, wherein the common optical output surface has a planar outer surface.

16. The device of claim 1, wherein locational orientations of the multi-wavelength laser source and the optical power splitter, including the corresponding N parallel optical pathways and the common optical output surface, are static with respect to each other.

17. A method, comprising:
   producing an optical output beam, including:
      emitting an optical beam from a multi-wavelength laser source optically coupled to an optical power splitter, the optical power splitter having N optical outputs, each optical output connected, by a corresponding optical pathway of a parallel array, to a common optical output surface of the optical beam sweeper; and
   wherein each of the corresponding N parallel optical pathways connecting the optical input to the common optical output surface has a different optical path length than the other parallel optical pathways, the different optical path lengths differing in a wavelength-dependent way.

18. The method of claim 17, further including changing a direction of the optical output beam by changing the wavelength of the optical beam emitted by the multi-wavelength laser source.

19. The method of claim 18, wherein the change in the direction is produced without moving the beam sweeper or its component parts.

20. The method of claim 17, further including simultaneously producing a plurality of the optical output beams by emitting a plurality of the optical beams each having a different wavelength, each optical beam being emitted from the multi-wavelength laser source.

21. The method of claim 17, wherein the common optical output surface has a planar outer surface.

* * * * *